United States Patent [19]

Gertitschke et al.

[11] Patent Number: 4,773,525

[45] Date of Patent: Sep. 27, 1988

[54] TRANSFER CONVEYOR FOR PACKAGING PLANT

[75] Inventors: Detlef Gertitschke; Herbert Rittinger, both of Laupheim; Peter Faller, Biberach, all of Fed. Rep. of Germany

[73] Assignee: Josef Uhlmann Maschinenfabrik GmbH & Co. KG, Laupheim, Fed. Rep. of Germany

[21] Appl. No.: 47,983

[22] Filed: May 7, 1987

[30] Foreign Application Priority Data

May 23, 1986 [DE] Fed. Rep. of Germany ....... 3617435

[51] Int. Cl.⁴ .................................................. B65G 37/00
[52] U.S. Cl. ................................ 198/471.1; 198/476.1; 414/225
[58] Field of Search .............. 414/225, 226, 732, 736, 414/737, 742, 743; 198/471.1, 476.1; 294/64.1, 65.5

[56] References Cited

U.S. PATENT DOCUMENTS

| | | | |
|---|---|---|---|
| 4,058,281 | 11/1977 | Albert | 294/64.1 X |
| 4,205,427 | 6/1980 | Koch et al. | 414/736 X |
| 4,211,153 | 7/1980 | Walters et al. | 93/535 D |
| 4,364,707 | 12/1982 | Ott | 414/737 X |
| 4,643,633 | 2/1987 | Lashyro | 414/732 |
| 4,645,063 | 2/1987 | Seragnoli | 198/471.1 X |

FOREIGN PATENT DOCUMENTS 2923909 12/1980 Fed. Rep. of Germany .
2922171 12/1980 Fed. Rep. of Germany .

Primary Examiner—Robert J. Spar
Assistant Examiner—Donald W. Underwood
Attorney, Agent, or Firm—Herbert Dubno; Andrew Wilford

[57] ABSTRACT

A transfer conveyor for transporting an object from an intake location to an output location according to the invention has a frame adjacent the locations, a planet carrier rotatable on the frame about a carrier axis, a wheel rotatable on the frame adjacent the carrier about the carrier axis, and at least one planet gear carried on the carrier and rotatable thereon about a planet axis parallel to but offset from the carrier axis. A ring gear meshing with the planet gear is centered on but not rotatable relative to the carrier axis. The gears have respective pitch circles and the circumference of the ring-gear pitch circle is a whole-number multiple of the circumference of the planet-gear pitch circle. A support carried on the wheel is coupled to the planet gear offset from the planet axis so that the support orbits about the planet axis as the planet gear rotates. A suction gripper mounted on the support moves jointly therewith at least radial of the carrier axis. A drive rotates the planet carrier about its axis and thereby displaces the suction gripper past the locations in a hypocycloid having cusps at the locations.

13 Claims, 3 Drawing Sheets

TRANSFER CONVEYOR FOR PACKAGING PLANT

FIELD OF THE INVENTION

The present invention relates to a transfer conveyor that moves objects between two locations in, for instance, a packaging plant. More particularly this invention concerns a rotary transfer conveyor capable of moving articles like bubble packs of pills between two angularly offset locations.

BACKGROUND OF THE INVENTION

It is frequently necessary in a packaging operation or the like to move a succession of objects between two locations which not only are offset to one another spatially because of the types of processing equipment involved, but to which the objects arrive and from which they exit at different rates. For instant in a pill-making plant a stamping or similar device will deliver bubble packs of pills with their flat sides vertical to an intake location from which they must be moved to an output location, for instance a conveyor belt or chute, where they must be deposited flat side horizontal. Thus the packages must be held securely as they are swung through about 90° between when they are picked up and when they are dropped off.

U.S. Pat. No. 4,211,153 to Walters and German patent document No. 2,922,171 filed 31 May 1979 by Rolf Andra describe such transfer conveyors which move objects between two adjacent locations. In the Walters device a plurality of suction cups are mounted on a carousel rotatable about a horizontal axis. These cups can move radially and angularly of the wheel in S-shaped tracks as the wheel rotates to bring the cups to a dead stop as they pick up and drop off a carton, passing through an intermediate position in which a flattened carton is broken open. In the device of Andra another such carousel carries a plurality of such suction cups, but they are not movable on the carousel. Instead the carousel is rotated by a step-type drive and is moved by another actuator toward and away from the pickup location where it pulls a bubble pack of pills from the machine that stamps it from a continuous strip of such pills to the output location where the individual bubble pack is dropped on an output conveyor.

Another arrangement seen in German patent document No. 2,923,909 filed 12 June 1978 by Otto Weller has another such carousel but carrying the suction grippers by means of complex lever-type linkages that allow these grippers to move relative to the carousel so they can move radially inwardly at least as the object, here a carton to be broken open, is pulled from the supply.

All these arrangements have the considerable disadvantage that the mechanism effecting the desired motion is extremely complex and acts in a jerky, normally reciprocating manner. Thus the parts are subject to substantial stress and have a short service life.

OBJECTS OF THE INVENTION

It is therefore an object of the present invention to provide an improved transfer conveyor.

Another object is the provision of such a transfer conveyor which overcomes the above-given disadvantages, that is which operates smoothly.

A further object is to provide a transfer conveyor which is of simple construction.

SUMMARY OF THE INVENTION

A transfer conveyor for transporting an object from an intake location to an output location according to the invention has a frame adjacent the locations, a planet carrier rotatable on the frame about a carrier axis, a wheel rotatable on the frame adjacent the carrier about the carrier axis, and at least one planet gear carried on the carrier and rotatable thereon about a planet axis parallel to but offset from the carrier axis. A ring gear meshing with the planet gear is centered on but not rotatable relative to the carrier axis. The gears have respective pitch circles and the circumference of the ring-gear pitch circle is a whole-number multiple of the circumference of the planet-gear pitch circle. A support carried on the wheel is coupled to the planet gear offset from the planet axis so that the support orbits about the planet axis as the planet gear rotates. A suction gripper mounted on the support moves jointly therewith at least radial of the carrier axis. A drive rotates the planet carrier about its axis and thereby displaces the suction gripper past the locations in a hypocycloid having cusps at the locations.

The gripper drive according to this invention is therefore of the hypocycloidal type described in German patent document Nos. 2,261,012 and 2,328,425. The wheel and planet carrier are relatively movable so that not only does the gripper follow a hypocycloidal path, but in addition as each gripper approaches each cusp of the path its angular motion slows sinusoidally, stopping at the point of the cusp and then increasing oppositely as it moves away therefrom. Such style of motion ensures that the gripper will not slip on the object as it initially adheres thereto, and also ensures that as an object is dropped off it will not have any angular component of motion.

In addition the plot of speed against time for the support, will be sinusoidal so that rather than brusquely reversing, the support will slow to a stop as it moves radially out into each cusp and then accelerate smoothly as it moves radial back from it. In addition the rotary motion of the wheel will not be at a constant speed, but will also increase and decrease sinusoidally from zero when the supports are at the cusp to a maximum when the support is midway between cusps. The angular motion of the wheel will never reverse, but will drop instantaneously to zero as the supports move into the cusps and then accelerate smoothly from zero, but in the same direction as before unlike the supports which reverse their radial directions at the cusps. All parts except the wheel and support and elements fixed to them will move continuously in a rotary fashion with constant speed, so wear on these parts will be even less than the parts moving at periodically varying or reversing speeds. Since the variation or reversal is wholly sinusoidal, even the wear on the parts not moving at a constant speed is minimal.

According to another feature of this invention a radial guide is provided on the wheel receiving the support and constraining same for movement solely radially of the carrier axis with the suction gripper always directed radially outward of the carrier axis. For highest efficiency the carrier supports a plurality of such planet gears angularly equispaced about the carrier axis and each having a respective support and gripper. The number of such planet gears being equal to the number of cusps, four according to a feature of the invention.

The planet gear according to this invention gear is provided with an eccentric entrainment pin offset from its axis and journaled in the support. In addition the ring gear is fixed in the frame and the drive includes a shaft on which the planet carrier is fixed. The wheel is journaled on the drive shaft.

The shaft of the instant invention is hollow and the conveyor comprises a suction device connected through the hollow shaft for aspirating air from the gripper. A flexible hose extends between the shaft and the gripper. Thus only a single rotary air coupling is needed.

The support includes a first arm projecting axially from the wheel and another arm carrying the gripper and extending radially outward relative to the carrier axis from the first arm.

In order to avoid the complicated valve arrangements of the prior art and to allow all the grippers to be connected together to a single suction line without interposition of the standard individual cam-operated valves, the system of this invention has a stripper element displaceable radially of the carrier axis past the gripper to push an object therefrom, an actuating lever having an outer end engageable with the stripper element to displace same outward, and an actuating element engageable with the actuating lever only when the gripper is at the output location for displacing the lever outward past the gripper. The actuating element is a roller fixed on the frame and rotatable about an axis generally radial of the carrier axis and the lever extends generally parallel to the carrier axis. A spring biases the lever into a position out of engagement with the element and a stop engages the lever when same is not engaged by the actuating element. Thus the objects are mechanically stripped from the grippers at the output location rather than just dropping therefrom when the air supply is cut off.

BRIEF DESCRIPTION OF THE DRAWING

The above and other features and advantages will become more readily apparent from the following description, reference being made to the accompanying drawing in which.

SPECIFIC DESCRIPTION

Figure 1:
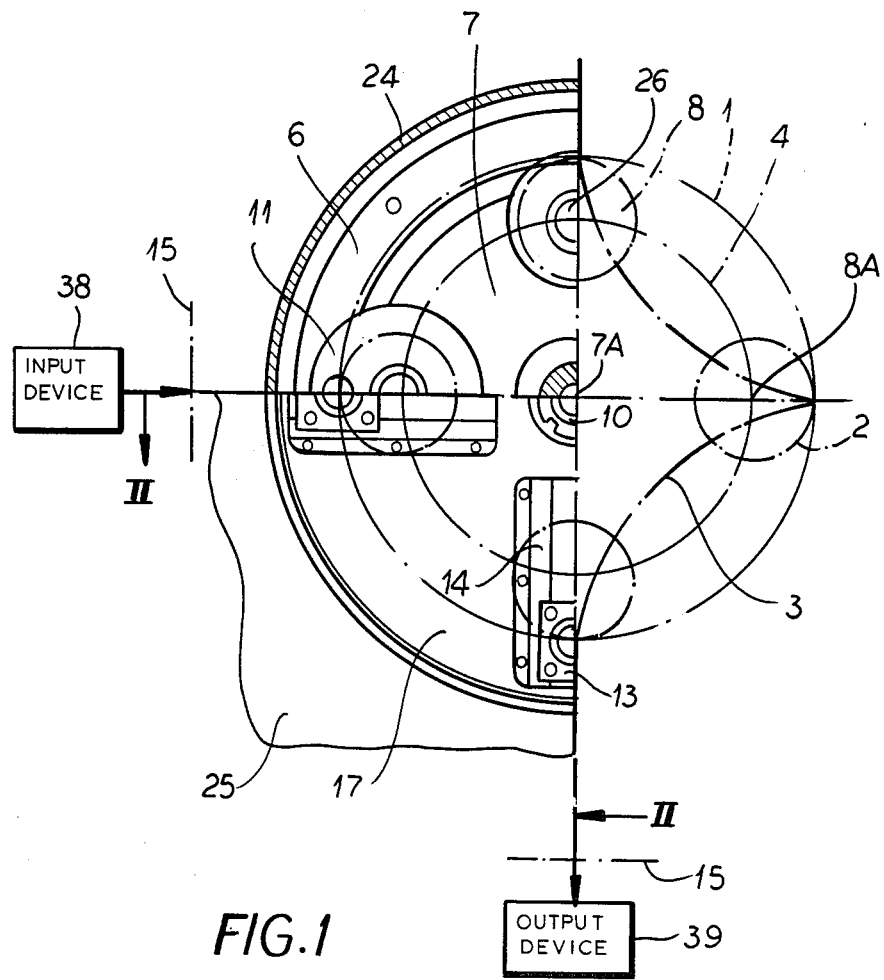
FIG. 1 is a partly schematic and diagrammatic side view of the transfer conveyor according to this invention.
Figure 2:
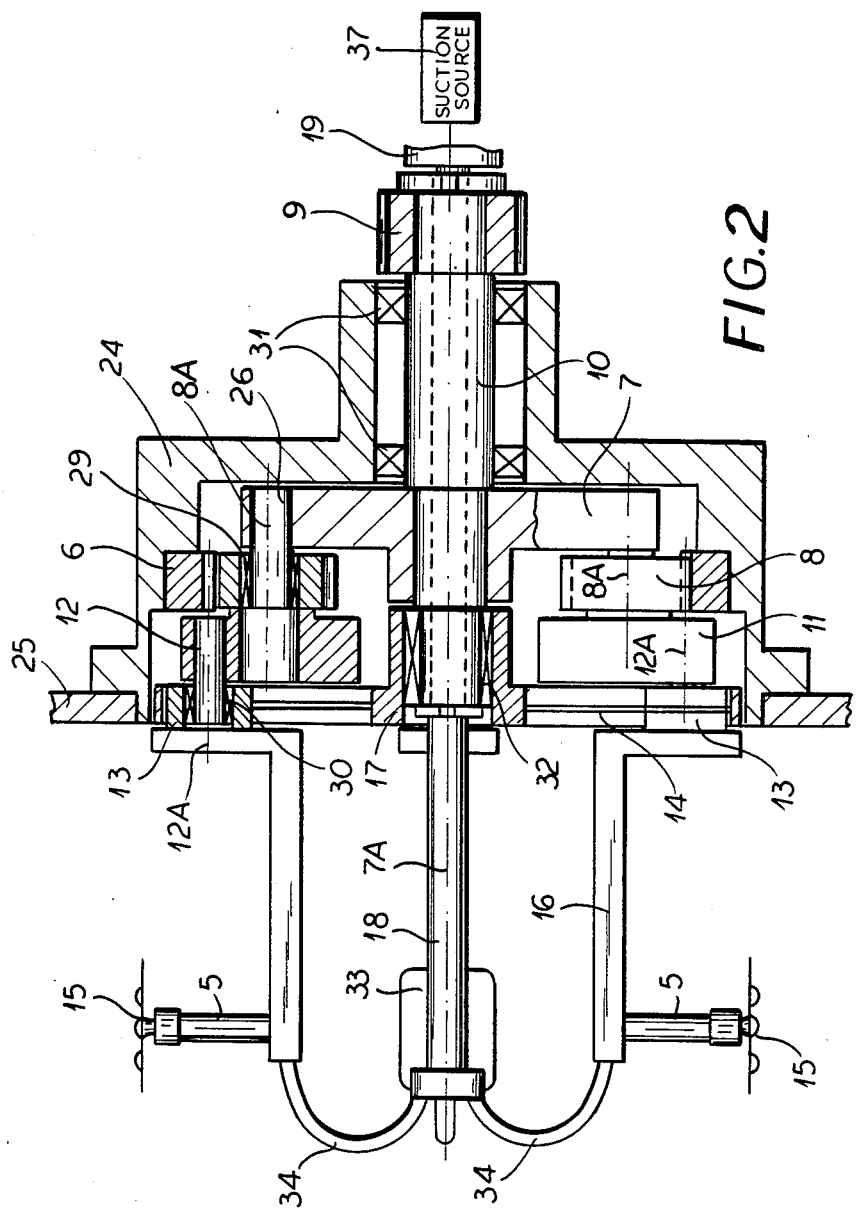
FIG. 2 is an axial section taken along right-angle line II—II of FIG. 1.

As seen in FIGS. 1 and 2 the transfer conveyor according to the present invention serves for displacing objects shown schematically at 15 from an input device 38, for instance a device which stamps individual bubble packs of pills from a continuous strip of same (see above-cited German patent document No. 2,922,171), to an output device 39, for instance a horizontal conveyor or a stacking bin. The objects 15 must be moved from a position oriented vertically at the input device 38 to a position oriented horizontally at the output device 39.

According to the invention the apparatus has a frame 25 carrying a housing 24 in which a main tubular drive shaft 10 is supported by bearings 31 for rotation about a horizontal wheel axis 7A that is perpendicular to the plane of the objects 15 in the input device 38. A wheel or carousel 17 supported by bearings 32 on the shaft 10 is centered on the axis 7A so that this wheel 17 and the shaft 10 rotate about the axis 7A independently of each other.

The shaft 10 is fixed to a planet carrier 7 centered on and defining the axis 7A and itself carrying four identical and angularly equispaced pins 26 carrying respective bearings 29 in turn carrying planet gears 8 defining respective axes 8A parallel to, angularly equispaced about, and radially equispaced from the axis 7A. An internally threaded ring gear 6 fixed in the housing 24 on the frame 25 meshes continuously with all of the gears 8. As seen in FIG. 1 the gear 6 has a pitch circle 1, the gears 8 have pitch circles 2 tangent to the circle 1, and the axes 8A define a circle 4 within and concentric with the circle 1.

The wheel 17 is formed with four guides 14 extending radially of the axis 7A and angularly equispaced thereabout. Radially slidable in each of these guides 14 is a respective support block 13 provided with a bearing 30 in which is journaled the outer end of a respective pin 12 which defines an axis 12A parallel to but offset from the respective axis 8A. The inner ends of these pins 12 are set in respective disks 11 fixed to the respective planet gears 8. Thus as each planet gear 8 rotates, the respective pin 12 will orbit its axis 12A about the axis 8A and the respective support 13 will reciprocate radially in the respective guide 14.

Each support 12 is fixed to an L-shaped arm 16 extending mainly parallel to the axis 7A and having an outer end provided with a suction gripper 5 that is always directed radially outward of the axis 7A since the supports 13 can only move radially in the guides 14. Thus these grippers 5 will move radially with the supports 13.

The inner end of the shaft 10 is provided with a drive gear or sprocket 9 and with a coupling 19 connected to a suction source 37, for instance the intake of a blower. This shaft 10 is hollow and has an outer end provided with an extension pipe 18 connected to a manifold 33 from which extend four flexible hoses 34 connected to the grippers 5. Thus these grippers 5 can be continuously evacuated to hold the objects 15 thereon by suction.

The kinematics of the drive are such that the grippers 5 will follow the hypocycloidal path shown at 3 in FIG. 1. This path 3 has cusps at the pitch circle 1 and one of these cusps is directly juxtaposed with the input device 38 and another with the output device 39.

In addition to following this hypocycloidal path 3 the actual angular displacement of the wheel 17 and of the grippers 5 increases and decreases sinusoidally, being in fact zero, that is without angular motion, at the cusps and being at a maximum therebetween. Thus at these cusps the motion of the grippers 5 is virtually solely radially outward. The grippers 5 of this invention therefore comes to the desired angular stop at the critical pickup and dropoff locations.

Figure 3:
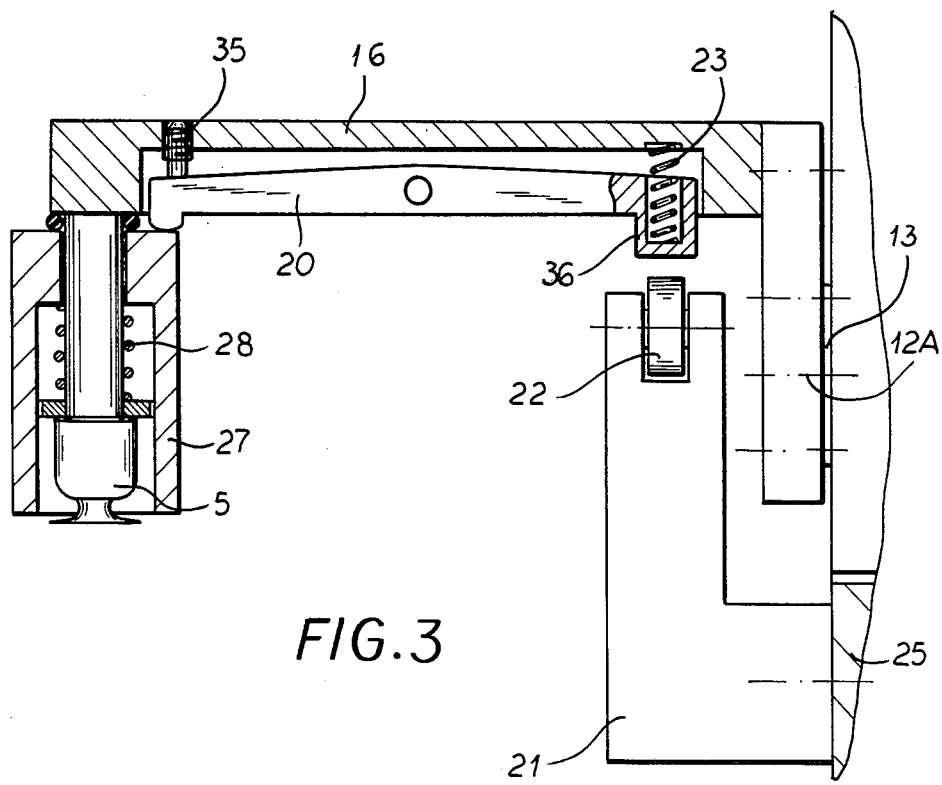
FIG. 3 is a large-scale axially sectional view of a detail of the apparatus of this invention.

In addition as shown in FIG. 3 each gripper 5 is surrounded by a tubular stripper cup 27 which can move from the illustrated retracted position to an advanced position projecting past the gripper 5. Each stripper 27 is continuously urged into the retracted position by a respective compression spring 28.

A lever 20 is pivoted centrally on each arm 16 about an axis perpendicular thereto and has an outer end that can bear in one direction against the stripper 27 but that is pushed by the stripper 27 and its spring 28 back against an adjustable stop 35 on the arm 16. The other end of each lever 20 is formed as a cup 36 holding another compression spring 23 bearing on the inner end of the respective arm 16 and urging the outer arm end 20 back against the stop 35 also.

The frame 25 is provided with a rigid arm 21 carrying at the output device 39 a roller 22 rotatable about an axis extending radial of the axis 7A and parallel to the wheel 17. This wheel 22 engages the inner end of the lever 20 when same passes the output device 39 to push out the stripper 27 and push a pill pack 15 off the respective gripper 5. This simple mechanical system eliminates the complicated valve arrangements of the prior art and operates reliably by actually pushing the objects 15 off the grippers 5 at the desired location.

We claim:

1. A transfer conveyor for transporting an object from an intake location to an output location offset therefrom, the conveyor comprising:
   a frame adjacent the locations;
   a planet carrier rotatable on the frame about a carrier axis;
   a wheel rotatable on the frame adjacent the carrier about the carrier axis;
   at least one planet gear carried on the carrier and rotatable thereon about a planet axis parallel to but offset from the carrier axis;
   a ring gear meshing with the planet gear and centered on but not rotatable relative to the carrier axis, the gears having respective pitch circles and the circumference of the ring-gear pitch circle being a whole-number multiple of the circumference of the planet-gear pitch circle;
   a support connected to the planet gear at a location offset from the planet axis;
   a radially extending guide on said wheel to constrain said support to radial movement as the planet gear rotates;
   a suction gripper mounted on the support for joint movement therewith at least radially of the carrier axis; and
   drive means for rotating the planet carrier about its axis and thereby displacing the suction gripper past the locations in a hydrocycloid having cusps at the locations.

2. The transfer conveyor defined in claim 1 wherein said guide is constructed to so constrain the support for movement solely radially of the carrier axis with the suction gripper always directed radially outward of the carrier axis.

3. The transfer conveyor defined in claim 1 wherein the carrier carries a plurality of such planet gears angularly equispaced about the carrier axis and each having a respective support and gripper, the number of such planet gears being equal to the whole number.

4. The transfer conveyor defined in claim 1 wherein the ring gear is internally toothed and the planet gear externally toothed.

5. The transfer conveyor defined in claim 1 wherein the support is solely radially displaceable within the guide, the planet gear being provided with an eccentric entrainment pin offset from its axis and journaled in the support, the carrier and wheel being relatively rotatable about the carrier axis.

6. The transfer conveyor defined in claim 1 wherein the ring gear is fixed in the frame and the drive means includes a drive shaft on which the planet carrier is fixed, the wheel being journaled on the drive shaft.

7. The transfer conveyor defined in claim 6 wherein the shaft is hollow and the conveyor comprises suction means connected through the hollow shaft for aspirating air from the gripper.

8. The transfer conveyor defined in claim 7 wherein the suction means includes a flexible hose extending between the shaft and the gripper.

9. The transfer conveyor defined in claim 1 wherein the support includes an arm projecting axially from the wheel and the gripper extends radially outward relative to the carrier axis from said arm.

10. The transfer conveyor defined in claim 9, further comprising:
    a stripper element on said support surrounding said gripper and displaceable radially of the carrier axis past the gripper to push an object therefrom;
    an actuating lever fulcrummed on said support and having an outer end engageable with the stripper element to displace same outward; and
    an actuating element positioned along the path of said support on said frame and engageable with the actuating lever only when the gripper is at the output location for displacing the lever outward past the gripper.

11. The transfer conveyor defined in claim 10 wherein the actuating element is a roller fixed on the frame and rotatable about an axis generally radial of the carrier axis, the lever extending generally parallel to the carrier axis.

12. The transfer conveyor defined in claim 10, further comprising
    a spring on said support biasing the lever into a position out of engagement with the element; and
    a stop on said support engaging the lever when same is not engaged by the actuating element.

13. In combination with an input device delivering objects to an input location with the objects oriented generally in a plane and with an output device for taking the objects oriented generally in a plane not parallel to the input-location plane from an output location offset from the input location, a transfer conveyor comprising:
    a frame adjacent the locations;
    a planet carrier rotatable on the frame about a carrier axis generally parallel to one of the planes and perpendicular to the other plane;
    a wheel rotatable on the frame adjacent the carrier about the carrier axis independently of the carrier and formed with a radially extending guide;
    at least one planet gear carried on the carrier and rotatable thereon about a planet axis parallel to but offset from the carrier axis;
    another gear fixed on the frame, meshing with the planet gear, and centered on but not rotatable relative to the carrier axis, the gears having respective pitch circles and the circumference of the pitch circle of the other gear being a whole-number multiple of the circumference of the planet-gear pitch circle;
    a support radially displaceable in the guide on the wheel;
    a pin fixed on the planet gear, offset from the axis thereof, extending parallel to the planet axis into the support, and having an outer end journaled in the support, whereby as the planet gear rotates the support reciprocates radially of the carrier axis in the guide;

a suction gripper mounted on the support directed radially outward from the carrier axis for joint movement with the support radial of the carrier axis; and drive means for rotating the planet carrier about its axis and thereby displacing the suction gripper past the locations in a hypocycloid having cusps at the locations.

* * * * *